(12) United States Patent
Schafer

(10) Patent No.: US 8,235,325 B2
(45) Date of Patent: Aug. 7, 2012

(54) FAN VARIABLE AREA NOZZLE POSITIONAL MEASUREMENT SYSTEM

(75) Inventor: Bradley C. Schafer, Ellington, CT (US)

(73) Assignee: United Technologies Corporation, Hartford, CT (US)

( * ) Notice: Subject to any disclaimer, the term of this patent is extended or adjusted under 35 U.S.C. 154(b) by 770 days.

(21) Appl. No.: 12/089,001

(22) PCT Filed: Oct. 12, 2006

(86) PCT No.: PCT/US2006/040250
§ 371 (c)(1),
(2), (4) Date: Apr. 2, 2008

(87) PCT Pub. No.: WO2008/045092
PCT Pub. Date: Apr. 17, 2008

(65) Prior Publication Data
US 2008/0302907 A1 Dec. 11, 2008

(51) Int. Cl.
*B64B 1/24* (2006.01)
(52) U.S. Cl. .................. 244/53 R; 60/226.1; 60/242
(58) Field of Classification Search ............... 60/226.1, 60/226.2, 226.3, 230, 242, 771; 239/265.39; 244/53 R, 51, 52, 12.4, 12.5, 23 D, 73 C
See application file for complete search history.

(56) References Cited

U.S. PATENT DOCUMENTS

| | | | | |
|---|---|---|---|---|
| 2,790,303 A | * | 4/1957 | Kutzler | 60/238 |
| 3,243,126 A | * | 3/1966 | Kurti et al. | 239/265.39 |
| 3,747,344 A | * | 7/1973 | Porter et al. | 60/242 |
| 3,830,058 A | * | 8/1974 | Ainsworth | 60/226.1 |
| 4,242,864 A | * | 1/1981 | Cornett et al. | 60/226.1 |
| 5,197,280 A | * | 3/1993 | Carpenter et al. | 60/204 |
| 5,261,227 A | * | 11/1993 | Giffin, III | 60/226.1 |

FOREIGN PATENT DOCUMENTS
FR 2273955 1/1976
GB 2229556 9/1990

OTHER PUBLICATIONS

Search Report PCT/US2006/040250.

* cited by examiner

*Primary Examiner* — Tien Dinh
*Assistant Examiner* — Keith L Dixon
(74) *Attorney, Agent, or Firm* — Carlson, Gaskey & Olds PC

(57) ABSTRACT

A positional measurement system for a fan variable area nozzle (FVAN) remotely determines the position of each flap or set of flaps relative a core nacelle. The positional measurement system includes a sensor system with a multiple of transceivers located within the core nacelle to remotely measure the position of each flap or set of flaps without the heretofore necessity of moving measurement components.

16 Claims, 4 Drawing Sheets

FAN VARIABLE AREA NOZZLE POSITIONAL MEASUREMENT SYSTEM

BACKGROUND OF THE INVENTION

The present invention relates to a sensor system, and more particularly to a turbofan engine having a positional measurement system for a fan variable area nozzle structure within the fan nacelle thereof.

Conventional gas turbine engines include a fan section and a core engine with the fan section having a larger diameter than that of the core engine. The fan section and the core engine are disposed in series along a longitudinal axis and are enclosed in a nacelle. An annular stream of primary airflow passes through a radially inner portion of the fan section and through the core engine to generate primary thrust.

Combustion gases are discharged from the core engine through a primary airflow path and are exhausted through a core exhaust nozzle. An annular fan flow path, disposed radially outwardly of the primary airflow path, passes through a radial outer portion between a fan nacelle and a core nacelle and is discharged through an annular fan exhaust nozzle defined at least partially by the fan nacelle and the core nacelle to generate fan thrust. A majority of propulsion thrust is provided by the pressurized fan air discharged through the fan exhaust nozzle, the remaining thrust provided from the combustion gases discharged through the core exhaust nozzle.

The fan nozzles of conventional gas turbine engines have fixed geometry. The fixed geometry fan nozzles must be suitable for take-off and landing conditions as well as for cruise conditions. However, the requirements for take-off and landing conditions are different from requirements for the cruise condition. Optimum performance of the engine may be achieved during different flight conditions of an aircraft by tailoring the fan exhaust nozzle for the specific flight regimes.

Some gas turbine engines have implemented fan variable area nozzles. The fan variable area nozzle provides a smaller fan exit nozzle diameter during cruise conditions and a larger fan exit nozzle diameter during take-off and landing conditions. Conventional variable area nozzles typically utilize relatively complex mechanisms to determine the position of the variable area nozzle. Typically, a linkage interconnects the fan variable area nozzle to a linear variable displacement transducer to mechanically interpret the fan variable area nozzle position. Although effective, the linkage may be relatively complicated and heavy in weight—especially for a fan variable area nozzle capable of asymmetric operation which requires multiple sets of linkages.

Accordingly, it is desirable to provide an effective, lightweight position determination system for a gas turbine engine fan variable area nozzle.

SUMMARY OF THE INVENTION

A positional measurement system for a fan variable area nozzle (FVAN) according to the present invention remotely senses the position of the FVAN relative a core nacelle. The position system includes a sensor system located within the core nacelle to remotely measure the position of each flap or set of flaps through a transmitted signal such as an optical, microwave, radio wave, laser or other signal which reflects off of the flap or set of flaps to measure the actual position thereof relative the core nacelle.

In a thrust vectorable FVAN, the positional measurement system includes an associated transceiver for each sector which communicate with the controller such that the position of each sector during asymmetrical thrust vectoring operation is readily determined.

The present invention therefore provides an effective, lightweight position determination system for a gas turbine engine fan variable area nozzle.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1A:
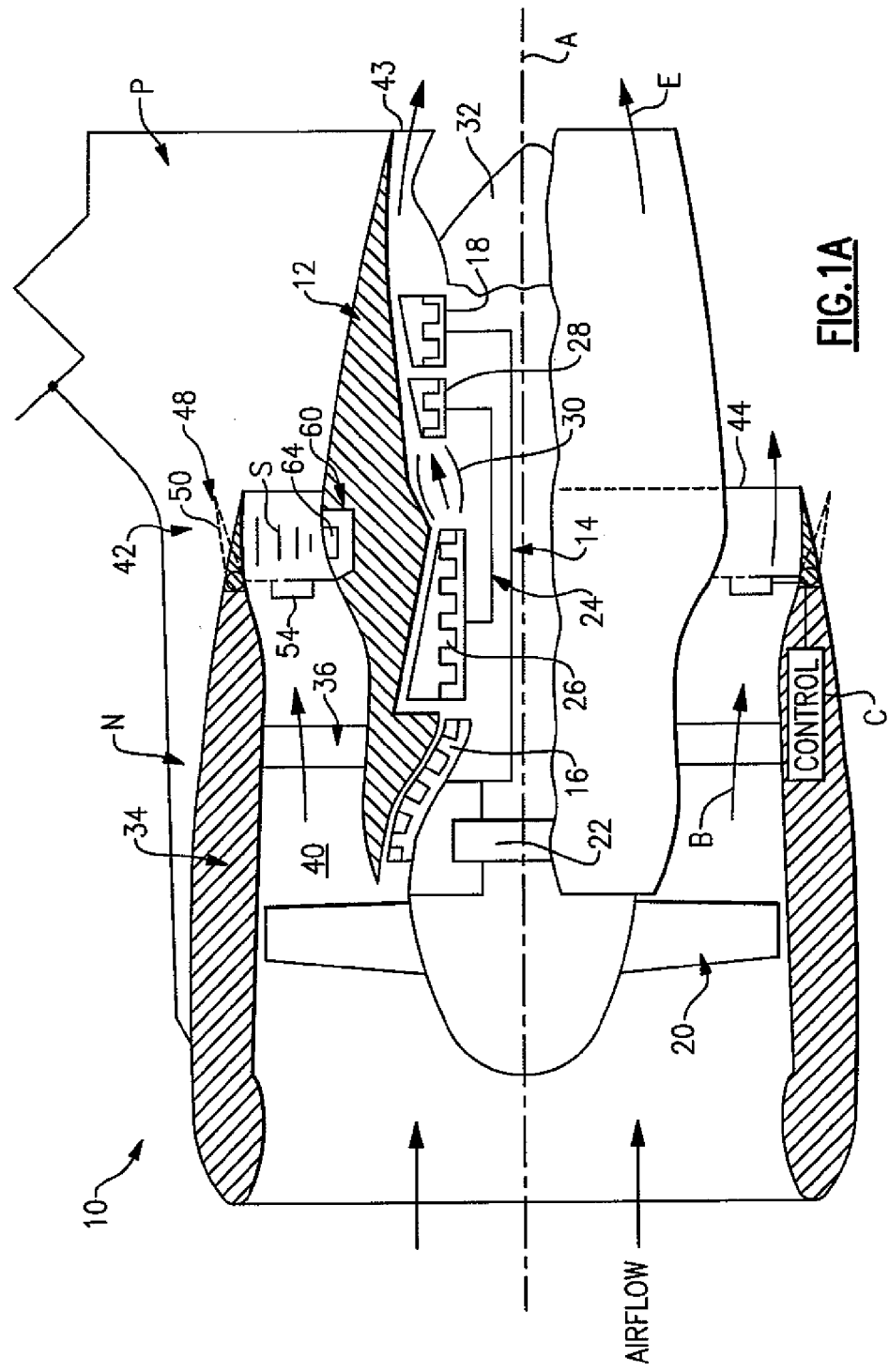
FIG. 1A is a general schematic partial fragmentary view of an exemplary gas turbine engine embodiment for use with the present invention.

FIG. 1A illustrates a general partial fragmentary schematic view of a gas turbofan engine 10 suspended from an engine pylori P within an engine nacelle assembly N as is typical of an aircraft designed for subsonic operation.

The turbofan engine 10 includes a core engine within a core nacelle 12 that houses a low spool 14 and high spool 24. The low spool 14 includes a low pressure compressor 16 and low pressure turbine 18. The low spool 14 drives a fan section 20 connected to the low spool 14 through a gear train 22. The high spool 24 includes a high pressure compressor 26 and high pressure turbine 28. A combustor 30 is arranged between the high pressure compressor 26 and high pressure turbine 28. The low and high spools 14, 24 rotate about an engine axis of rotation A.

The engine 10 is preferably a high-bypass geared turbofan aircraft engine. Preferably, the engine 10 bypass ratio is greater than ten (10), the fan diameter is significantly larger than that of the low pressure compressor 16, and the low pressure turbine 18 has a pressure ratio that is greater than 5. The gear train 22 is preferably an epicyclic gear train such as a planetary gear system or other gear system with a gear reduction ratio of greater than 2.5. It should be understood, however, that the above parameters are only exemplary of a preferred geared turbofan engine and that the present invention is likewise applicable to other gas turbine engines.

Airflow enters a fan nacelle 34 which at least partially surrounds the core nacelle 12. The fan section 20 communicates airflow into the core nacelle 12 to power the low pressure compressor 16 and the high pressure compressor 26. Core airflow compressed by the low pressure compressor 16 and the high pressure compressor 26 is mixed with the fuel in the combustor 30 where is ignited, and burned. The resultant high pressure combustor products are expanded through the high pressure turbine 28 and low pressure turbine 18. The turbines 28, 18 are rotationally coupled to the compressors 26, 16 respectively to drive the compressors 26, 16 in response to the expansion of the combustor product. The low pressure turbine 18 also drives the fan section 20 through the gear train 22. A core engine exhaust E exits the core nacelle 12 through a core nozzle 43 defined between the core nacelle 12 and a tail cone 32.

Figure 1B:
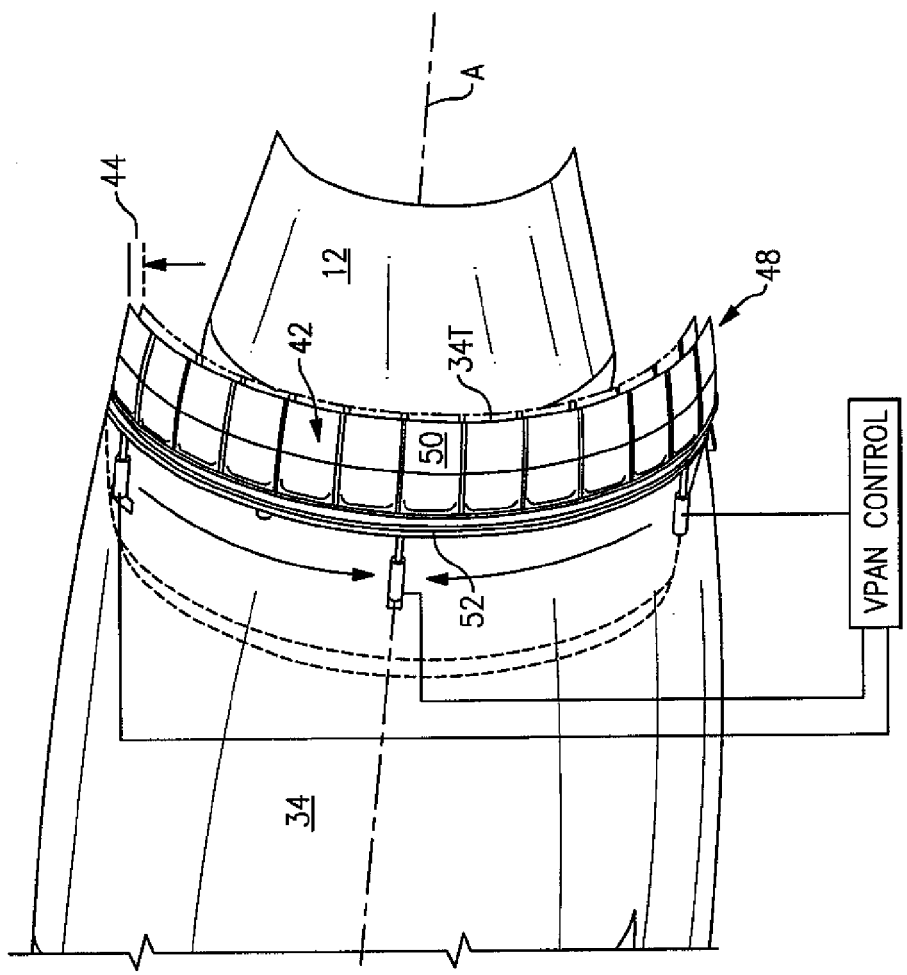
FIG. 1B is a perspective partial phantom view of the FVAN.

The core nacelle 12 is supported within the fan nacelle 34 by structure 36 often generically referred to as an upper and lower bifurcation. A bypass flow path 40 is defined between the core nacelle 12 and the fan nacelle 34. The engine 10 generates a high bypass flow arrangement with a bypass ratio in which over 80 percent of the airflow entering the fan nacelle 34 becomes bypass flow B. The bypass flow B communicates through the generally annular bypass flow path 40 and is discharged from the engine 10 through a fan variable area nozzle (FVAN) 42 (also illustrated in FIG. 1B) which varies an effective fan nozzle exit area 44 between the fan nacelle 34 and the core nacelle 12.

Thrust is a function of density, velocity, and area. One or more of these parameters can be manipulated to vary the amount and direction of thrust provided by the bypass flow B. The FVAN 42 changes the physical area and geometry to manipulate the thrust provided by the bypass flow B. However, it should be understood that the fan nozzle exit area 44 may be effectively altered by other structural changes. Furthermore, it should be understood that effectively altering the fan nozzle exit area 44 is not limited to physical locations approximate the exit of the fan nacelle 34, but rather, may include the alteration of the bypass flow B at other locations.

The FVAN 42 defines the fan nozzle exit area 44 for discharging axially the fan bypass flow B pressurized by the upstream fan section 20 of the engine 10. A significant amount of thrust is provided by the bypass flow B due to the high bypass ratio. The fan section 20 is preferably designed for a particular flight condition—typically cruise at 0.8 MACH and 35,000 feet.

As the fan blades of fan section 20 are efficiently designed at a particular fixed stagger angle for the cruise condition, the FVAN 42 is operated to vary the fan nozzle exit area 44 to adjust fan bypass air flow such that the angle of attack or incidence of the fan blades are maintained close to the design incidence at other flight conditions, such as landing and take-off, thus enabling optimized engine operations over a range of other flight conditions with respect to performance and to meet other operational parameters such as noise level. Preferably, the FVAN 42 defines a nominal converged cruise position for the fan nozzle exit area 44 and radially opens relative thereto to define a diverged position for other flight conditions. The FVAN 42 preferably provides an approximately 20% (twenty percent) change in the fan exit nozzle area 44. It should be understood that other arrangements as well as essentially infinite intermediate positions as well as thrust vectored positions in which some circumferential sectors of the FVAN 42 are converged or diverged relative to other circumferential sectors are likewise usable with the present invention.

The FVAN 42 is preferably circumferentially separated into at least four sectors 42A-42D (FIG. 1C) which are each independently adjustable to asymmetrically vary the fan nozzle exit area 44 to generate vectored thrust. It should be understood that although four segments are illustrated, any number of segments may alternatively or additionally be provided.

In operation, the FVAN 42 communicates with a controller C or the like to adjust the fan nozzle exit area 44 in a symmetrical and asymmetrical manner. Other control systems including an engine controller, flight control system or such like may also be usable with the present invention. By adjusting the entire periphery of the FVAN 42 symmetrically in which all sectors are moved uniformly, thrust efficiency and fuel economy are maximized during each flight condition. By separately adjusting the circumferential sectors 42A-42D of the FVAN 42 to provide an asymmetrical fan nozzle exit area 44, engine fan bypass flow is selectively vectored to provide, for example only, trim balance, thrust controlled maneuvering, enhanced ground operations or short field performance.

The FVAN 42 generally includes a flap assembly 48 which varies the fan nozzle exit area 44. The flap assembly 48 is preferably incorporated into the fan nacelle 34 to define a trailing edge 34T thereof. The flap assembly 48 generally includes a multiple of flaps 50, a respective multiple of flap linkages 52 and an actuator system 54 (also illustrated in FIG. 1B) It should be understood that although flaps 50 are illustrated in the disclosed embodiment, other FVAN 42 systems which vary the fan nozzle exit area 44 will likewise be usable with the present invention.

Figure 1C:
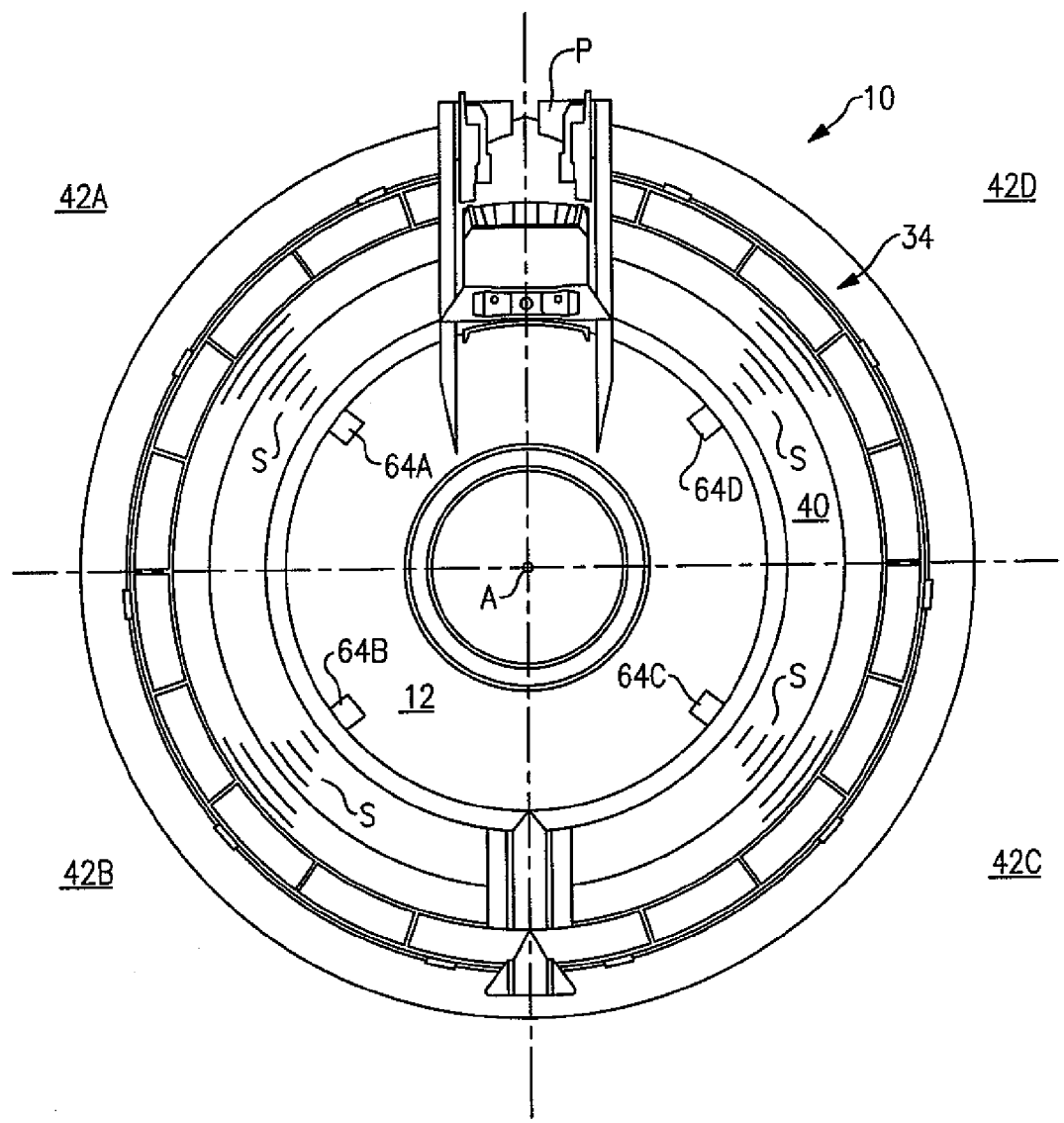
FIG. 1C is a rear view of the engine.
Figure 2:
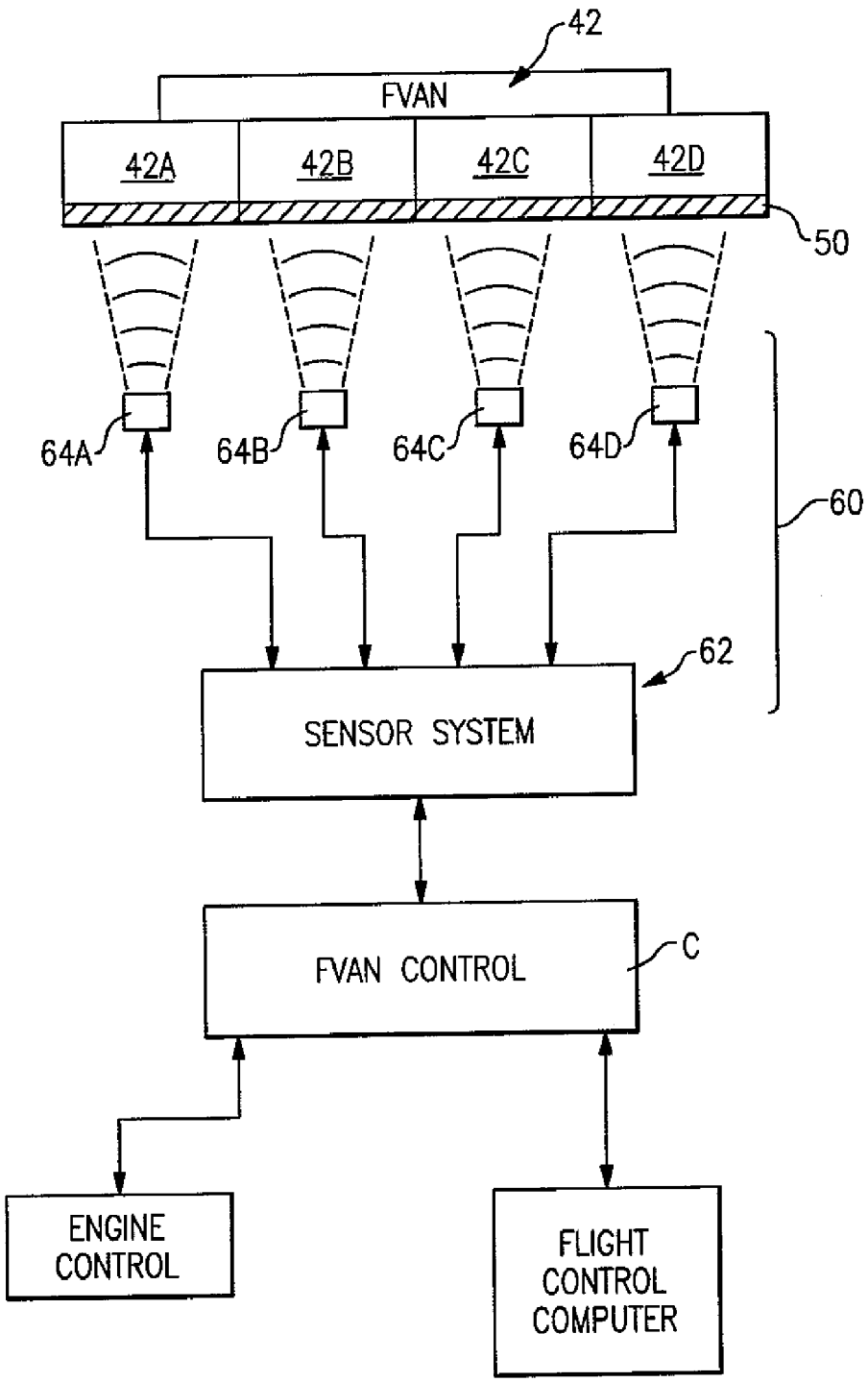
FIG. 2 is a block diagram of the positional measurement system.

The position of the FVAN 42 is determined by a positional measurement system 60 (FIG. 2). The positional measurement system 60 remotely senses the position of each flap 50 (FIG. 1B) or set of flaps 50 (FIG. 1C—sectors 42A-42D). The positional measurement system 60 includes a sensor system 62 located within the core nacelle 12 to remotely measure the position of each flap 50 or set of flaps 50 through a signal S such as a microwave, radio, optical laser, or other transmitted signal which reflects off of the flap 50 or set of flaps 50 to measure their actual position relative the core nacelle 12.

The sensor system 62 includes a transceiver 64 located within the core nacelle 12 to a direct the signal S in a radial direction toward the flap 50 or set of flaps 50. The signal S may include various signals or combinations of signals including microwave, radio, optical, laser, or the like. It should be understood that the transceiver 64 is preferably flush mounted within the core nacelle 12 to minimize effect on fan bypass flow B.

The sensor system 62 communicates with the FVAN controller C which determines and controls the position of the FVAN 42 in response to the signal S. The controller C determines the position of the FVAN 42 by interrogating, for example, the time for the signals to travel and return to each transceiver 64. Such time determination is interpreted as the distance of the FVAN 42 relative the core nacelle 12. It should be understood that various signal interrogation methods may be utilized with the present invention. It should be further understood that the FVAN controller C may communicate with a higher level controller such as an engine controller, flight control computer, or such like (FIG. 2).

In a thrust vectorable FVAN 42 (FIG. 1C), the positional measurement system 60 includes an associated transceiver 64A-64D for each sector 42A-42D (FIG. 2). Each of the transceivers 64A-64D preferably communicates with the controller 66 such that the position of each sector 42A-42D during asymmetrical thrust vectoring operation is readily determined.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A nacelle assembly for a gas turbine engine comprising:
a core nacelle defined about an axis;
a fan nacelle mounted at least partially around said core nacelle, said fan nacelle having a fan variable area nozzle which defines a fan exit area between said fan nacelle and said core nacelle; and a positional measurement system mounted at least partially within said core nacelle and directed toward said fan variable area nozzle to determine a position of said fan variable area nozzle.

2. The assembly as recited in claim 1, wherein said positional measurement system includes a transceiver which transmits a signal toward said fan variable area nozzle.

3. The assembly as recited in claim 2, wherein said positional measurement system communicates with a higher level engine controller.

4. A gas turbine engine comprising:
a core engine defined about an axis;
a gear system driven by said core engine;
a fan driven by said gear system about said axis;
a core nacelle defined at least partially about said core engine;
a fan nacelle mounted around said fan and at least partially around said core nacelle, said fan nacelle having a fan variable area nozzle which defines a fan exit area downstream of said fan between said fan nacelle and said core nacelle;
a sensor system mounted at least partially within said core nacelle and directed toward said fan variable area nozzle; and
a controller in communication with said sensor to determine a position of said fan variable area nozzle.

5. The engine as recited in claim 4, wherein said sensor system includes a multiple of transceivers.

6. The engine as recited in claim 4, wherein said fan variable nozzle includes a multiple of flap sets, each of said flap sets separately driven by a respective actuator to asymmetrically and symmetrically adjust said fan variable area nozzle, said sensor system including a multiple of sensors wherein each sensor is directed toward each of said multiple of flap sets.

7. A method of determining a position of a fan variable area nozzle of a gas turbine engine comprising the steps of:
(A) transmitting a signal from a core nacelle to reflect off a fan variable area nozzle; and
(B) determining the position of the fan variable area nozzle relative the core nacelle in response to said step (A).

8. A method as recited in claim 7, wherein said step (A) further comprises:
(a) transmitting a microwave signal.

9. A method as recited in claim 7, wherein said step (A) further comprises:
(a) transmitting an optical signal.

10. A method as recited in claim 7, wherein said step (A) further comprises:
(a) transmitting an acoustic signal.

11. A method as recited in claim 7, wherein said step (B) further comprises: (a) determining a time for the signal to return to the core nacelle.

12. The assembly as recited in claim 1, wherein said core nacelle is supported within said fan nacelle by an upper and lower bifurcation.

13. The assembly as recited in claim 1, further comprising a core exit area of said core nacelle downstream of said fan exit area.

14. The assembly as recited in claim 1, wherein said positional measurement system is mounted at least partially within said core nacelle and directed radially outward toward said fan variable area nozzle.

15. The engine as recited in claim 4, wherein said sensor system is directed radially outward toward said fan variable area nozzle.

16. A method as recited in claim 7, wherein said step (A) further comprises:
(a) transmitting the signal radially outward toward the fan variable area nozzle.

\* \* \* \* \*